(12) United States Patent
Walworth

(10) Patent No.: X2639
(45) Date of Patent: Jul. 15, 1816

(54) BLOCKS,SHEAVES,MOULDING BUSHES

(76) Inventor: Thomas P. Walworth

Thomas [illegible] Walworth
Letters Patent.

The Schedule referred to in these Letters Patent and making part of the same containing a description in the words of the said Thomas [illegible] Walworth himself of his apparatus for moulding bushes or cogs for chains or pullies The apparatus for moulding bushes or cogs for chains or pullies consists of a flask (such as is generally used by a founder) of any convenient size, and four boards, or plates of metal, fitting the size of the flask. The first board has the flange part of the patterns attached to it with holes through the centre of the [illegible] same and board of sufficient size to admit the barrel part of the patterns, and with holes (for rivet holes) through the flanges, one near each corner ) and through the board. the [illegible] for the [illegible] fastened to the centre of the board extending to each flange part of the bushes or cogs. there are four steady pins to this board two on opposite ends to agree with holes in the flask. The second board or plate has as many pins attached to it as there are rivet holes in the flanges on the first boards and of sufficient length to pass through the first boards into the flanges the depth of the countersinks, leaving a space between the first and second boards equal to the thickness of the flanges on the first board, which space is formed by four steady pins (two on opposite ends) attached to the second board passing through the first board and resting on the flask. There are also holes in this board to agree with the holes in the first board at the centre of the [illegible]. The third board or plate has the barrel part of the patterns attached to it, as many in number as there are flanges on the first board ) of sufficient length to pass through the second and first boards and thro the centre of the flanges so as to form the exact shape and size of the bushes or cogs on the first board. The fourth board has as many pins attached to it as there are barrels attached to the third board of a size to agree with the inside of the barrels and of sufficient
length to extend into the barrels passing through the third and second
and first boards. leaving a space between the fourth and third boards equal
to the length of the barrels below the flanges on the first board, which
space is caused by four pins (two on opposite ends) attached to the fourth
board passing through the third and second boards and resting on the
first board, The fifth board placed on it to form the countersink
to the rivet holes in the flanges. The process for moulding the bush
es or dogs. is by placing that part of the flask, commonly called the
nowel in a convenient place for moulding, with the holes for the
steady pins uppermost, then the first board (to which is attached the flange
part of the patterns) is placed on the flask the steady pins in the
board filling the holes in the flask to keep it from varying; then the
second board is placed on the first board; the third on the second, and
the fourth on the third; two narrow strips of wood are put between
the fourth and third boards (of sufficient thickness to fill the space)
to prevent any variation by the pressure of the sand while moulding;
then by turning the boards and flasks over the exact shape and size of
the bushes or dogs are to be seen on the first board. the sand is then
thrown freely into the flask (on the patterns) untill the flask is
full. a board is then placed on the flask and the whole is turned
bottom up, the two strips of wood between the fourth and third boards
are taken out. and the fourth or top board (to which is attached the
pins that extend into the barrel part of the patterns) is kept firmly to
its place to prevent the sand moulded in the barrels from rising while
the third board, (to which is attached the barrel part of patterns) is
drawn up to the fourth or top board, then the two boards (fourth and
third) are taken off; then the second board (to which is attached the
pins that fit the rivet holes in the flanges) is kept firmly to its place
to prevent the sand that form the rivet holes in the flanges from rising
while the first board (to which is attached the flange part of the patterns)
is drawn up to it. the second and first boards are then taken off and this part of the mould is finished. The other part of the flask (commonly called the cope) is moulded on the fifth board which has the places in it to form the countersinks to agree with the rivet holes in the flanges. A sprew is moulded in the centre of this part of the flask to agree with the gates in the other part, this part of the flask is then placed on the other part of the flask, and the mould is then ready to admit the melted metal. Another board or plate may be added to the five already mentioned with holes in it the size of the flanges for the flange paterns to draw through to prevent the sand from breaking. When the boards and paterns are placed ready for the sand to be thrown in, steel cores may be placed in the bands instead of sand which make the casting very hard and smooth. This principle of moulding applies to carriage boxes bed hinges and most other small articles Witnesses)
Wm [illegible] Ward )
Jno. Austin )

Thomas [illegible] [illegible]

[illegible]

(1092 words)

( Patented 13. July 1816 )